United States Patent [19]

Augustin et al.

[11] Patent Number: 5,277,566
[45] Date of Patent: Jan. 11, 1994

[54] EXTRUSION IMPREGNATING DEVICE

[75] Inventors: Günter Augustin; Georg Hinrichsen, both of Berlin, Fed. Rep. of Germany; Hans-Joachim Traenckner, Merksem, Belgium

[73] Assignee: Hoechst Aktiengesellschaft, Fed. Rep. of Germany

[21] Appl. No.: 56,194

[22] Filed: May 3, 1993

Related U.S. Application Data

[63] Continuation of Ser. No. 902,382, Jun. 23, 1992, abandoned, which is a continuation of Ser. No. 780,872, Oct. 17, 1991, abandoned, which is a continuation of Ser. No. 597,430, Oct. 15, 1990, abandoned, which is a continuation of Ser. No. 420,014, Oct. 11, 1989, abandoned.

[30] Foreign Application Priority Data

Oct. 19, 1988 [DE] Fed. Rep. of Germany ....... 3835574

[51] Int. Cl.$^5$ ............................................. B29C 47/02
[52] U.S. Cl. ................................... 425/114; 264/136; 264/137; 264/174; 425/113
[58] Field of Search ............... 264/136, 137, 174, 257, 264/271.1, 279, 279.1; 156/180, 182, 441; 425/113, 114, 111

[56] References Cited

U.S. PATENT DOCUMENTS

| Re. 32,772 | 10/1988 | Hawley | 264/136 |
|---|---|---|---|
| 2,538,628 | 1/1951 | Pendleton | 68/43 |
| 3,993,726 | 11/1976 | Moyer | 264/280 |
| 4,312,917 | 1/1982 | Hawley | 428/375 |
| 4,588,538 | 5/1986 | Chung et al. | 264/29.2 |
| 4,609,515 | 9/1986 | Smyth | 264/136 |
| 4,728,387 | 3/1988 | Hilakos | 156/180 |
| 4,864,964 | 9/1989 | Hilakos | 264/174 |
| 4,883,625 | 11/1989 | Glemet et al. | 264/136 |
| 4,900,499 | 2/1990 | Mills | 264/257 |

Primary Examiner—Jay H. Woo
Assistant Examiner—James P. Mackey
Attorney, Agent, or Firm—Connolly & Hutz

[57] ABSTRACT

Extrusion impregnating device for continuous production of unidirectionally fibre-reinforced polymer mouldings with fibre contents between 50 and 70 vol-%, which makes it possible to produce linear profiles with circular, oval or rectangular cross-sections while at the same time enabling high-quality impregnation and the attainment of excellent mechanical characteristics.

3 Claims, 1 Drawing Sheet

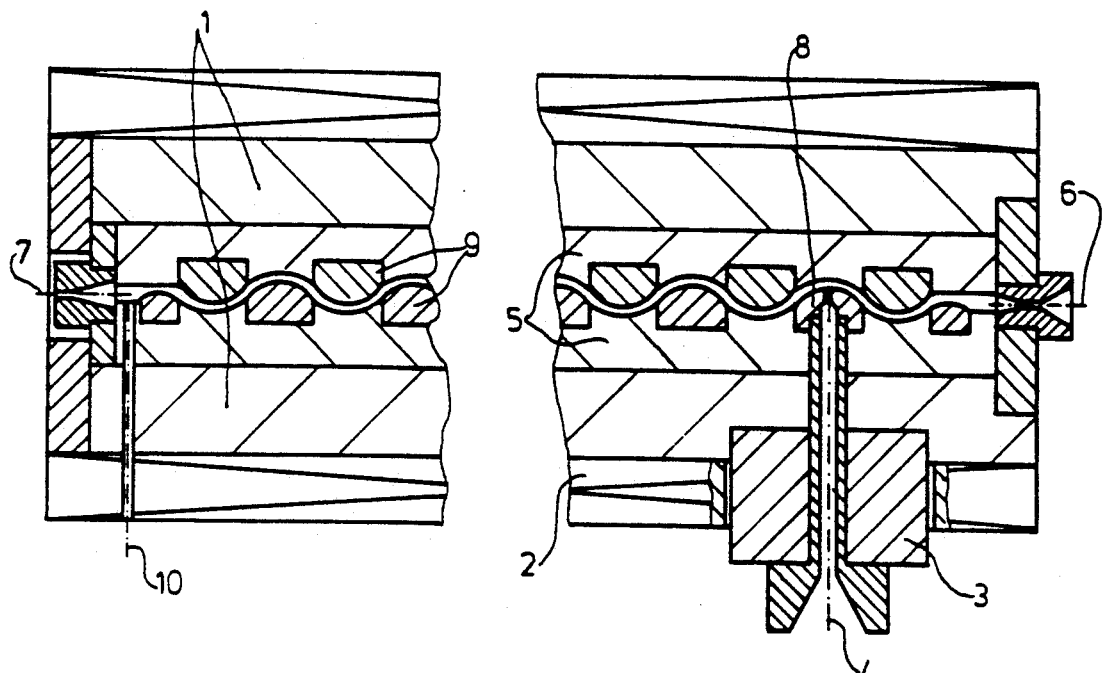
FIG. 1
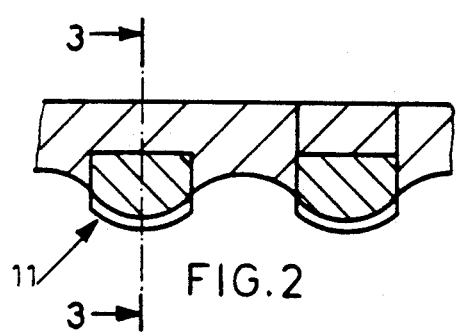
FIG. 2
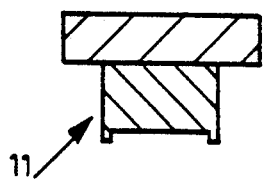
FIG. 3
FIG. 5
FIG. 7
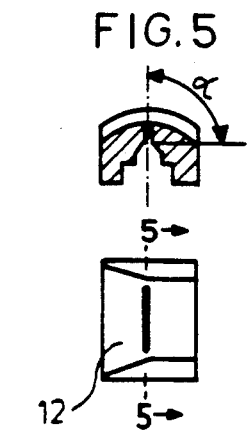
FIG. 4
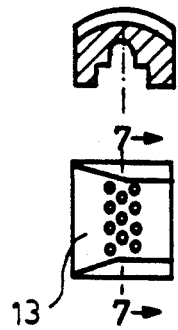
FIG. 6

5,277,566

EXTRUSION IMPREGNATING DEVICE

CROSS-REFERENCE TO RELATED APPLICATIONS

The present application is a continuation of application Ser. No. 07/902,382, filed Jun. 23, 1992, now abandoned, which is in turn a continuation of Ser. No. 07/780,872, filed Oct. 17, 1991, now abandoned, which in turn is a continuation of application Ser. No. 07/597,430, filed Oct. 15, 1990, now abandoned, which in turn is a continuation of application Ser. No. 07/420,014, filed Oct. 11, 1989, now abandoned.

The invention relates to an extrusion impregnating device for the continuous production of unidirectionally fibre-reinforced polymer mouldings with fibre contents between 50 and 70 vol-%, which enables the production of linear profiles with circular, oval or rectangular cross-sections, while at the same time making it possible to achieve high-quality impregnation and excellent mechanical characteristics.

The device is particularly suitable for processing temperature-sensitive melts of thermoplastic polymers.

BRIEF DESCRIPTION OF THE DRAWING

Novel features and advantages of the present invention in addition to those mentioned above will become apparent from the following detailed description in conjunction with the accompanying drawing wherein similar reference characters refer to similar parts and in which:

FIG. 1 is a longitudinal sectional view of an extrusion impregnating device, according to the present invention;

FIG. 2 is a partial longitudinal sectional view of the spreader units for deflecting the thermoplastic and fiber materials within the extrusion impregnating device;

FIG. 3 is a sectional view taken along line 3—3 of FIG. 2;

FIG. 4 is a plan view of the split-type gate of the device of FIG. 1;

FIG. 5 is a sectional view taken along line 5—5 of FIG. 4;

FIG. 6 is a plan view of an alternate gate in the form of a multi-point gate; and FIG. 7 is a sectional view taken along line 7—7 of FIG. 6.

DETAILED DESCRIPTION OF THE INVENTION

The extrusion impregnating device (FIG. 1) consists of a split casing (1) with split heating jacket (2), possessing an extruder connector (3) with a melt inlet (4), further possessing a separable impregnating insert (5) with a replaceable inlet nozzle for fibre material (6) and a replaceable outlet nozzle for the fibre-reinforced linear profile (7), and comprising an injection unit (8), spreader unit (deflection unit) (9) and an overflow (10).

After inserting the strand of fibres, the impregnating insert can either be closed by itself and inserted into the heating jacket, or the insert can be closed by a closure mechanism via the split heating shell.

The impregnating insert consists of two opposite rows of curved spreader units or deflection units (9), which, in the closed condition, form a narrow undulating polymer flow duct. Said deflection units can either be replaceably fitted into the insert or directly machined into the insert as a milled contour. FIG. 2 shows a replaceable deflection unit.

The polymer flow duct formed is, as regards its cross-section, so dimensioned by lateral limiting webs (11) at the deflection units (FIGS. 2 and 3) as to achieve a predetermined (maximum) degree to which the fibre structure expands. The relative position of the spreader units in relation to one another is selected in such a way that the fibre band is deflected only slightly from its straight path and the melt volume is kept low.

At the first deflection units the strand of fibres introduced in a prestressed state is preheated and fed, subject to preselected expansion, to an injection unit supplied with polymer melt through a sprue. The polymer injection can take place through a slit-type gate (12) subject to different injection angles (45°, 135°) or through a multipoint gate (13). FIGS. 4–7 show such injection units.

In order to avoid break-up of the strand of fibres and so as to seal the polymer flow duct in respect of the preheating zone, a lower degree of expansion is set, via the limiting webs, for the injection unit, than prevails in the flow duct.

The strand of fibres passing in a prestressed state over the injection unit, is permeated by the injected melt, whereby the existing gaseous phase is partly displaced, it being possible for the liberated gases to escape through the inlet nozzle. At the same time, the flow duct is filled with melt.

The preimpregnated strand is then reimpregnated throughout the following spreader units, in the course of which process further polymer material can be absorbed from the flow duct.

During the impregnating process the melt and fibre band pass through the flow duct in the same direction. The process can be operated in such a way as to adjust the melt requirement exactly by means of the extrusion rate, or use can be made of excessive melt, whereby the excess is removed through an overflow fitted upstream of the outlet nozzle. With the latter embodiment, the strand of fibres is permeated more intensely and fragmented fibres originating during the process of production can be flushed out.

The fibre content and the cross-sectional geometry of the linear profiles are adjusted by means of the outlet nozzle.

The tool is designed in such a way as to ensure impregnation gentle to the fibres while minimising the melt volume. In this way the temperature of the melt can be quickly raised to the level required for impregnation, without any significant thermal degradation taking place. At the same time the shear rate dependence of the melt viscosity is made use of in an optimal manner.

Hence, the process can also be used for processing polymers of extreme thermal sensitivity.

The tool is suitable for producing profiles from virtually all known fibre materials and can be used for virtually any thermoplastic materials. Examples of such fibres are fibreglass rovings and carbon fibres, and examples of thermoplastic materials are polyamides, (polyamide 6, polyamide 66, polyamide 12), aliphatic polyesters (polyethylene terephthalate, polybutylene terephthalate, polyarylene sulfide, polyphenylene sulfide) and mixtures combining said thermoplastics.

The invention also relates to a process for the production of such profiles with the aid of the tool forming the subject of the invention.

EXAMPLE 1

A 2400 tex E fibreglass roving (type RX 28, from Owens Corning Fiberglass) was processed by means of the extrusion tool shown in FIG. 1, using the melt of a low-viscosity polyamide 6 (BAYER AG) at a mass temperature of about 300° C., so as to produce linear profiles (cross-section about 0.3 mm×5 mm).

Using a slit-type gate with an injection angle $\alpha=90°$, the extrusion rate was, with the overflow closed, adjusted to the melt consumption (100% utilisation of material).

The ribbons produced at a production rate of 3.5 m/min exhibited a fibre content of about 68 vol-%, and, owing to the high impregnating quality, their mechanical characteristics were excellent.

| | |
|---|---|
| Tensile strength (MPa) | 1321 ± 20 |
| Flexural strength (MPa) | 1121 ± 18 |
| Modulus of flexural elasticity (GPa) | 47.6 ± 0.9 |
| Elongation (%) | 3.2 ± 0.2 |

EXAMPLE 2

In the same way as in example 1, polyethylene terephthalate (tenite 7741) was processed. The rectangular linear profiles with a fibre content of about 60 vol-% and produced at a production rate of 3.6 m/min, possessed similarly good mechanical characteristics.

| | |
|---|---|
| Tensile strength (MPa) | 1349 ± 9 |
| Flexural strength (MPa) | 1159 ± 20 |
| Modulus of flexural elasticity (GPa) | 39 ± 1 |
| Elongation (%) | 3.6 ± 0.1 |

EXAMPLE 3

In the same way as in example 1, polyphenylene sulfide (type A 6112046 from BAYER AG) was processed at a mass temperature of about 350° C. and with an injection angle $\alpha=45°$. Subject to a production rate of 3.0 m/min, rectangular linear profiles were produced, with fibre contents of about 64 vol-%.

| | |
|---|---|
| Tensile strength (MPa) | 1327 ± 8 |
| Flexural strength (MPa) | 1145 ± 15 |
| Modulus of flexural elasticity (GPa) | 43.2 ± 2.1 |
| Elongation (%) | 3.4 ± 0.1 |

EXAMPLE 4

In the same way as in example 1, polyamide 66 of medium viscosity (BAYER AG) was processed at a mass temperature of about 320° C. and subject to an injection angle $\alpha=45°$. The rectangular linear profiles produced at a rate of 4.0 m/min had a fibre content of about 64 vol-% and possessed excellent mechanical characteristics.

| | |
|---|---|
| Tensile strength (MPa) | 1530 ± 9 |
| Flexural strength (MPa) | 1243 ± 11 |
| Modulus of flexural elasticity (GPa) | 41.7 ± 0.8 |
| Elongation (%) | 3.4 ± 0.2 |

EXAMPLE 5

In the same way as in example 1, polyamide imide was processed at a mass temperature of about 420° C. and subject to an injection angle $\alpha=45°$. The rectangular linear profiles produced at a rate of 15 m/min had a fibre content of 67 vol-%. Fibre fragments at the surface pointed to less good mechanical characteristics.

| | |
|---|---|
| Tensile strength (MPa) | 1090 ± 12 |
| Flexural strength (MPa) | 880 ± 90 |
| Modulus of flexural elasticity (GPa) | 34 ± 8 |
| Elongation (%) | 3.1 ± 0.5 |

EXAMPLE 6

A 1600 tex C-fibre roving (type ETA 16000, Enka AG) was processed, in the same way as in example 1, using the melt of a low-viscosity polyamide 6 (BAYER AG) to unidirectionally fibre-reinfored ribbons, the mass temperature being about 300° C. and the rate of production 0.7 m/min.

The melt was supplied in excess at an injection angle $\alpha=135°$ C. (melt flow: melt consumption=10:1), any fibre fragments being removed, together with the excess melt, through the overflow. The ribbons produced had a fibre content of $(47\pm2)$ vol-%.

| | |
|---|---|
| Flexural strength (MPa) | 945 ± 40 |
| Modulus of flexural elasticity (GPa) | 82.3 ± 3.2 |
| Elongation (%) | 1.4 ± 0.3 |

EXAMPLE 7

In the same way as in example 6, a polyphenylene sulfide (type A 6112046, BAYER AG) was processed at a mass temperature of about 360° C. and at a rate of 0.8 m/min. The unidirectionally fibre-reinforced ribbons had a fibre content of $(47\pm2)$ vol-%.

| | |
|---|---|
| Flexural strength (MPa) | 1243 ± 27 |
| Modulus of flexural elasticity (GPa) | 86.3 ± 1.7 |
| Elongation (%) | 1.6 ± 0.1 |

We claim:

1. An extrusion impregnating device for producing fiber reinforced linear profiles comprising a split casing with a split heated jacket, the casing having an extruder connector with a melt inlet for introducing thermoplastic material, a separable impregnating insert within the casing having a replaceable inlet nozzle for introducing fiber material into the impregnating insert, a replaceable outlet nozzle through which fiber-reinforced linear profiles exit, an injection unit for introducing thermoplastic material into the impregnating insert onto the fiber materials and for deflecting and expanding the fiber materials, a plurality of deflection units within the impregnating insert for deflecting and expanding the thermoplastic and fiber materials, and an overflow connected to the impregnating insert.

2. An extrusion impregnating device as in claim 1 wherein the deflection units extend from the inlet nozzle to the outlet nozzle and define an undulating path of travel from the inlet nozzle to the outlet nozzle.

3. An extrusion impregnating device as in claim 1 wherein each of the deflecting units includes spaced apart lateral limiting webs for limiting lateral movement of the thermoplastic and fiber materials.

* * * * *